United States Patent
Dolinski et al.

(10) Patent No.: US 9,954,364 B2
(45) Date of Patent: Apr. 24, 2018

(54) LOCKOUT-TAGOUT SYSTEMS AND METHODS

(71) Applicant: ASCO Power Technologies L.P., Florham Park, NJ (US)

(72) Inventors: Walter Dolinski, Sayreville, NJ (US); Matthew A. Tyler, Morristown, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 308 days.

(21) Appl. No.: 14/832,402

(22) Filed: Aug. 21, 2015

(65) Prior Publication Data
US 2017/0054293 A1 Feb. 23, 2017

(51) Int. Cl.
*H02J 9/04* (2006.01)
*H01H 19/63* (2006.01)
*H02J 3/00* (2006.01)

(52) U.S. Cl.
CPC ............... *H02J 3/005* (2013.01); *H02J 9/04* (2013.01)

(58) Field of Classification Search
CPC .............................. H02J 5/005; H04B 5/0037
USPC .................................................. 307/100–145
See application file for complete search history.

(56) References Cited

U.S. PATENT DOCUMENTS

| | | | | |
|---|---|---|---|---|
| 4,871,885 A * | 10/1989 | Kamada | ................ | B60R 16/005 200/16 R |
| 6,617,532 B1 * | 9/2003 | Turek | ..................... | H01H 9/283 200/43.14 |
| 7,371,980 B2 * | 5/2008 | Marshall | ................ | H01H 9/283 200/43.11 |
| 2004/0245077 A1 * | 12/2004 | Benda | .................... | H01H 9/282 200/43.15 |
| 2007/0056835 A1 * | 3/2007 | Manahan | ................. | H01H 3/08 200/50.02 |
| 2010/0024588 A1 * | 2/2010 | Nocko | ..................... | G05G 1/04 74/526 |
| 2011/0072933 A1 * | 3/2011 | Boyce | ..................... | G05G 1/04 74/532 |
| 2013/0037393 A1 * | 2/2013 | Howard | ................. | H01H 9/282 200/43.14 |
| 2013/0214903 A1 * | 8/2013 | Kalous | ..................... | G05B 1/01 340/5.61 |
| 2015/0255966 A1 * | 9/2015 | Oneufer | .................. | H02B 1/48 361/631 |

* cited by examiner

*Primary Examiner* — Brandon S Cole
(74) *Attorney, Agent, or Firm* — McDonnell Bohenen Hulbert & Berghoff LLP

(57) ABSTRACT

A transfer switch including a lockout-tagout assembly and lockout-tagout method are provided. An example method includes a latch of a transfer switch actuating a first switch, wherein actuating the first switch sends an inhibit signal to an electronic controller of the transfer switch. The example method further includes the latch actuating a second switch, wherein actuating the second switch opens operator cutoff thereby preventing function of an operator assembly of the transfer switch. Still further, the example method includes, after the latch actuating the first switch and the second switch, locking the latch so as to mechanically prevent the source contact from closing.

20 Claims, 14 Drawing Sheets

LOCKOUT-TAGOUT SYSTEMS AND METHODS

BACKGROUND

Unless otherwise indicated herein, the materials described in this section are not prior art to the claims in this application and are not admitted to be prior art by inclusion in this section.

The present disclosure is generally directed to systems and methods for locking and tagging out electrical equipment. More specifically, the present disclosure is directed to a mechanical assembly for use with an electric power switching transfer switch.

Automatic transfer switches are typically used as an integral component in a power-distribution system having additional upstream and downstream electrical equipment. Automatic transfer switches are used to switch loads between a normal power source and an alternate emergency power source. The normal power source may, for example, be the local power utility company, and the alternate emergency power source may, for example, be a backup power generator.

Electrical equipment typically requires periodic maintenance. For instance, electrical equipment often requires cleaning, repairs, testing, and/or adjustments. Further, some electrical equipment may require replacement. Consequently, there is a need to provide service personnel with means to create a safe working environment by disconnecting electricity to the equipment which the service personnel are servicing. One way to accomplish this disconnecting of electricity is to disconnect power with a circuit breaker where contacts can be opened and the operator mechanism can be padlocked in the "open" position to prevent accidental closing of contacts. Preventing the closing of contacts would prevent re-energizing the circuit. In general, facilities with electrical equipment have a specific procedure which establishes the minimum requirements for lockout of energy sources that could cause injury to service personnel. This procedure is commonly referred to as a lockout-tagout procedure.

Unlike circuit breakers, however, typical automatic transfer switches are not provided with means to perform lockout-tagout procedures. Consequently, to service equipment downstream from the switch, an additional breaker is required to be installed downstream from the automatic transfer switch and ahead of the equipment to be serviced.

SUMMARY

A transfer switch having a lockout-tagout assembly is provided. In an example embodiment, the transfer switch includes a switch-panel assembly and a lockout-tagout assembly. The switch-panel assembly includes a first source contact, a second source contact, and an electronic controller. Further, the lockout-tagout assembly includes a first mechanical latch having a first handle and a second mechanical latch having a second handle. The first mechanical latch is configured to (i) during rotation of the first handle, (a) actuate a first switch so as to send an inhibit signal to the electronic controller and (b) actuate a second switch so as to disable a first operator thereby preventing closing of the first source contact and (ii) after actuating the first switch and the second switch, (a) move in a proximal direction and (b) lock so as to mechanically prevent the first source contact from closing. Further, the second mechanical latch is configured to (i) during rotation of the second handle, (a) actuate a third switch so as to send an inhibit signal to the electronic controller and (b) actuate a fourth switch so as to disable a second operator thereby preventing closing of the second source contact and (ii) after actuating the third switch and the fourth switch, (a) move in a proximal direction and (b) lock so as to mechanically prevent the second source contact from closing.

In another example embodiment, the transfer switch includes a source contact, a first switch in communication with an electronic controller, and a second switch in communication with an operator of the transfer switch. Further, the transfer switch includes a mechanical latch assembly comprising (i) a slide having a slide slot, (ii) a handle, and (iii) an actuation rod connecting the handle to the slide, wherein the actuation rod is rotatable about an axis and moveable along the axis. Still further, the transfer switch includes a contact shaft in communication with the source contact and the slide. Yet still further, the transfer switch includes a latching hub fixed on an end of the contact shaft, wherein the latching hub is arranged in the slide slot. And yet still further, the transfer switch includes a torsion hub rotationally fixed to the actuation rod, wherein the torsion hub is configured to actuate the first switch and the second switch as the handle is rotated from a first position to a second position, wherein actuating the first switch sends an inhibit signal to the electronic controller and actuating the second switch disables the operator thereby preventing closing of the source contact. The actuation rod is prevented from moving in a proximal direction along the axis when the handle is in the first position, and the actuation rod is configured to move in the proximal direction along the axis after the handle is rotated from the first position to the second position.

In yet another example embodiment, a method for lockout-tagout is disclosed. The method includes a latch of a transfer switch actuating a first switch, wherein actuating the first switch sends an inhibit signal to an electronic controller of the transfer switch. Further, the method includes the latch actuating a second switch, wherein actuating the second switch opens an operator cutoff thereby preventing function of an operator assembly of the transfer switch. Still further, the method includes, after the latch actuating the first switch and the second switch, locking the latch so as to mechanically prevent the source contact from closing.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
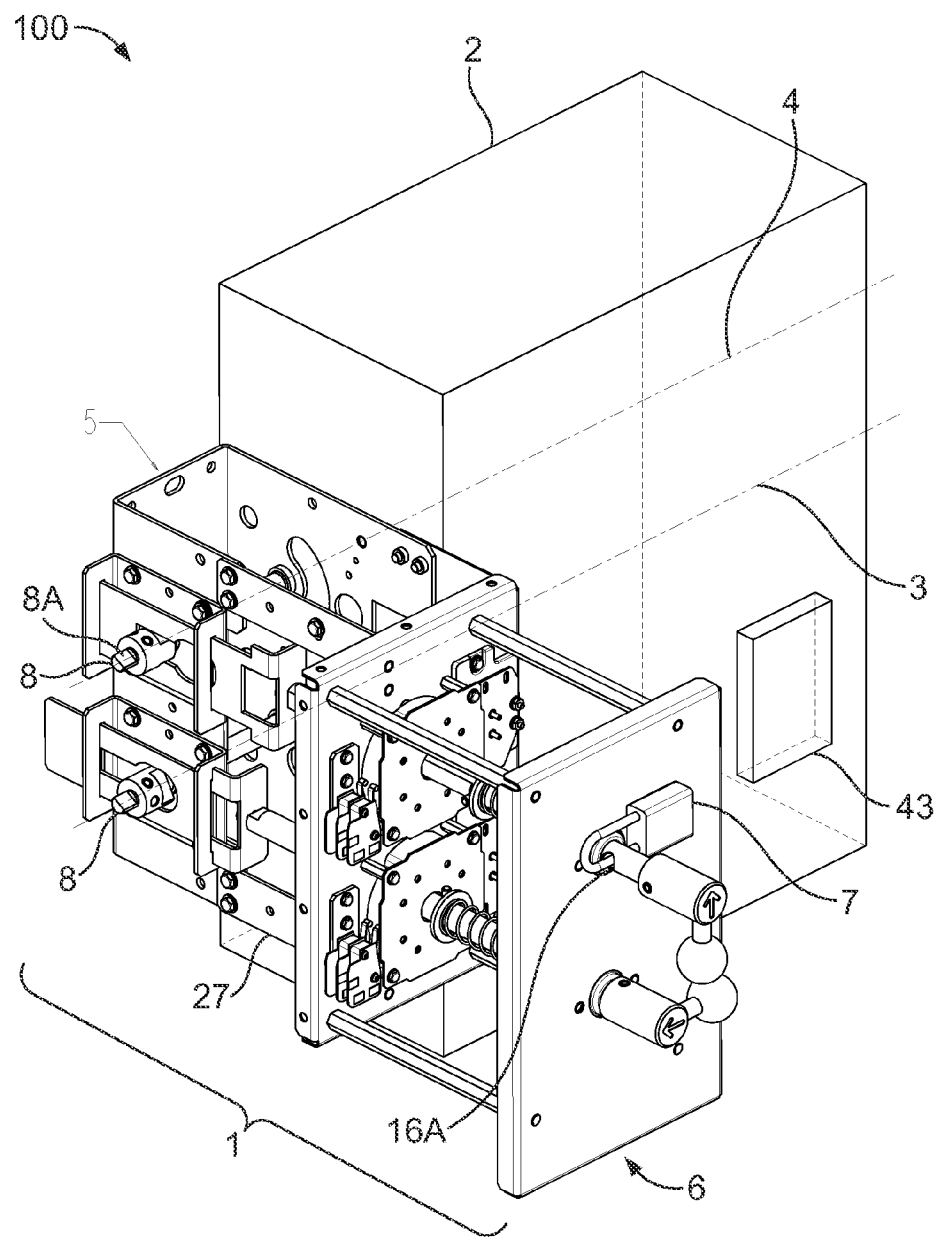
FIG. 1A is an isometric view of an example transfer-switch system having an example lockout-tagout assembly mounted to an example switch-panel assembly, according to an example embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

As mentioned above, unlike circuit breakers, typical automatic transfer switches are not provided with means to perform lockout-tagout procedures. Consequently, to service equipment downstream from a transfer switch, an additional breaker is typically required to be installed downstream from the transfer switch and ahead of the equipment to be serviced. In order to provide an option to eliminate this additional breaker, or to provide additional means of disconnecting power, the proposed lockout-tagout mechanism can be part of or used in conjunction with a transfer switch to provide the functionality for lockout-tagout procedures.

The proposed systems and methods provide a means for disconnecting electrical power from a transfer switch by electronically inhibiting the switch controller, disabling the operator, and physically locking the switch contacts in an open position. In an example embodiment, the proposed lockout-tagout system prevents the switch from automatically switching electrical loads in several ways:

(i) An operation inhibit signal is sent to the transfer-switch controller to disable transfer functions of the controller;

(ii) Electrical power to the switch operator is disconnected, the operator function is disabled, and the transfer switch cannot transfer;

(iii) Movement of an operator mechanism is obstructed with interfering components, thus preventing the main switch contacts from closing; and (iv) The lockout state is maintained by engaging a lock (e.g., a padlock) in a designated mechanism hole configured to receive the lock.

Lockout-tagout is a safety procedure outlined by the Occupational Safety and Health Administration (OSHA). In general, lockout-tagout is used to prevent the release of hazardous energy during service, maintenance, and/or installation of industrial equipment. A typical lockout-tagout procedure involves service personnel physically taking a padlock with a unique key and identification tag and engaging the proper safety latches to disable equipment before the service personnel begin service. Each service worker on the job uses their own padlock, and the padlock is not removed until the service worker is done with service. Unique keys for each worker prevent unlocking (e.g., accidental unlocking and/or intentional unlocking) by anyone else aside from the service worker intending the equipment to be locked out.

In the switching and power industry, the main hazardous energy is electrical power. It would be desirable to provide a lockout-tagout of a transfer switch that is both robust and reliable, and that provides a simple and safe way to prevent the release of electrical power. Beneficially, the disclosed methods and systems provide such a lockout-tagout of a transfer switch. To achieve this, in an example embodiment, the disclosed methods and systems first send an inhibit signal to the electronic controller to prevent a transfer signal. Second, the power circuit to the switch operator is opened, preventing actuation of the switch operator (and thus preventing the source contacts from being closed). Third, the source contacts are locked in the open position by means of a mechanical latch that utilizes interference of parts to prevent the operator from being transferred, thus closing the contacts and energizing the system downstream.

An example transfer switch in accordance with the present disclosure may include a switch-panel assembly and a lockout-tagout assembly. The switch-panel assembly may include a first source contact(s), a second source contact(s), and an electronic controller. The lockout-tagout assembly may include a first mechanical latch having a first handle and a second mechanical latch having a second handle. The first mechanical latch may be configured to (i) during rotation of the first handle, (a) actuate a first switch so as to send an inhibit signal to the electronic controller and (b) actuate a second switch so as to disable a first operator thereby preventing closing of the first source contact(s) and (ii) after actuating the first switch and the second switch, (a) move in a proximal direction and (b) lock so as to mechanically prevent the first source contact(s) from closing. Further, the second mechanical may be configured to (i) during rotation of the second handle, (a) actuate a third switch so as to send an inhibit signal to the electronic controller and (b) actuate a fourth switch so as to disable a second operator thereby preventing closing of the second source contact(s) and (ii) after actuating the third switch and the fourth switch, (a) move in a proximal direction and (b) lock so as to mechanically prevent the second source contact(s) from closing.

The disclosed method and system utilize a two-step actuation process to achieve the full locked-out state. As an initial matter, before initiating the two-step actuation process, from outside of the transfer-switch enclosure, the user may select which part of the transfer switch that the user would like to lock out. In an example embodiment, two handles are provided. In particular, a first handle is provided for first source contacts (e.g., often used for utility power) and a second handle is provided for second source contacts (e.g., often used for generator backup power). One or both handles may be actuated as described herein.

First, the selected handle is turned (e.g., clockwise) a given amount. In an example, the given amount is 90 degrees. During the turn motion, a control switch is first actuated to send an inhibit signal to the electronic controller. This inhibit signal prevents the controller from allowing the switch to transfer. Also during the handle turn motion, a second control switch is actuated which opens the switch operator power circuit preventing current from energizing the operator. Second, after the handle is turned the given amount (e.g., a full 90 degrees), the handle may then be pulled outwards in a proximal direction for a given amount (e.g., a stroke of approximately 1.5 inches) exposing a padlock hole. When the handle is pulled out, the operator latch is engaged thus mechanically preventing the contacts from being closed. To finish the lockout-tagout procedure, the user may engage the padlock in the designated mechanism hole. When service is complete and it is appropriate to return the switch to the active state, the padlock may be removed from the mechanism hole. After the handle is released, the mechanism springs automatically return the handle to the initial position. Springs reverse both the proximal movement of the handle and the rotation movement of the handle, thus returning the handle to the initial position.

In an example embodiment, an internal interlock prevents the handle from being pulled before the turn function. This internal interlock may beneficially assure that the power is cut to the operator first, thus preventing the operator from activating while the mechanical latch is being engaged. Beneficially, this prevents potential damage to integral switching components. Further, the automatic-return features ensure that the switch is active after maintenance is complete and the padlock is removed.

In an example embodiment, the proposed systems and methods prevent the transfer switch from closing open contacts. Although the systems and methods are primarily described as preventing the transfer switch from closing open contacts, in another example embodiment, the proposed systems and methods prevent the transfer switch from opening closed contacts.

2. Example Transfer Switch and Method

FIGS. 1-12 illustrate an example transfer switch and transfer switch components, in accordance with example embodiments of the present disclosure. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Still further, it should be understood that all of the discussion above is considered part of this detailed disclosure.

Figure 1B:
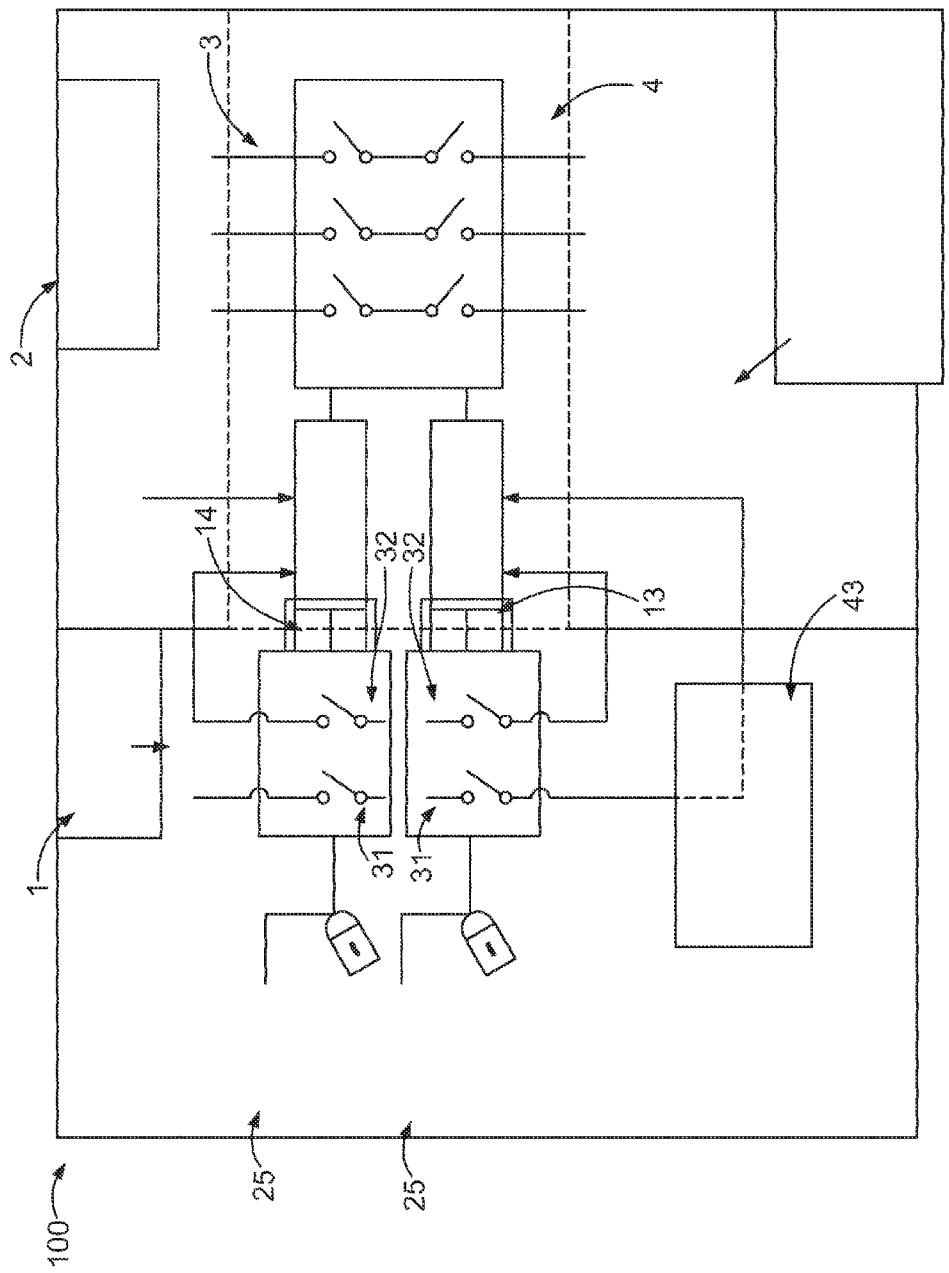
FIG. 1B is a block diagram of the example transfer-switch system of FIG. 1A, according to an example embodiment of the present disclosure.

FIG. 1A is an isometric view of an example transfer-switch system with an example lockout-tagout assembly mounted to an example switch-panel assembly. FIG. 1B is a block diagram of the example transfer-switch system of FIG. 1A.

The switch-panel assembly includes a first source contact, a second source contact, and an electronic controller. Further, the lockout-tagout assembly includes a first mechanical latch having a first handle and a second mechanical latch having a second handle. The first mechanical latch is configured to (i) during rotation of the first handle, (a) actuate a first switch so as to send an inhibit signal to the electronic controller and (b) actuate a second switch so as to disable a first operator thereby closing the first source contact and (ii) after actuating the first switch and the second switch, (a) move in a proximal direction and (b) lock so as to mechanically prevent the first source contact from closing. Further, the second mechanical latch is configured to (i) during rotation of the second handle, (a) actuate a third switch so as to send an inhibit signal to the electronic controller and (b) actuate a fourth switch so as to disable a second operator thereby closing of the second source contact and (ii) after actuating the third switch and the fourth switch, (a) move in a proximal direction and (b) lock so as to mechanically prevent the second source contact from closing.

In particular, FIG. 1A illustrates an example transfer-switch system 100 that includes lockout-tagout assembly 1 mounted to switch-panel assembly 2. The switch-panel assembly 2 includes two sets of contacts—first source contacts 3 and second source contacts 4. First source contacts 3 and second source contact 4 are each connected to the lockout-tagout assembly 1 by respective contact shafts 8. In FIG. 1A, the second source contacts 4 are shown in the contacts-locked state, whereas the first source contacts 3 are shown in the contacts-unlocked state.

Figure 2A:
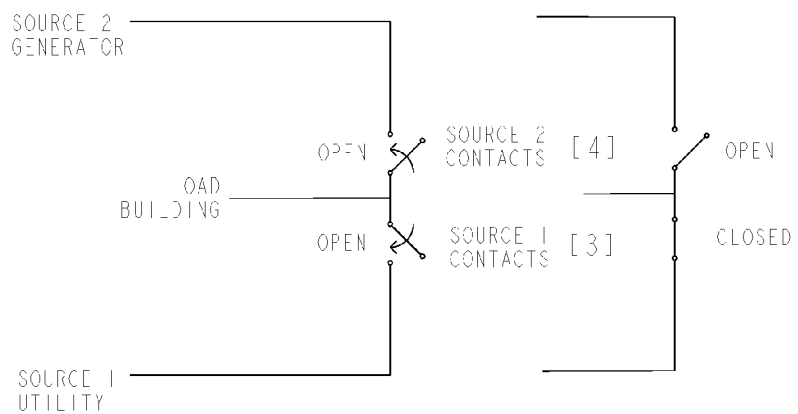
FIG. 2A is an example electrical schematic showing example source contacts of the transfer-switch system of FIG. 1A, according to an example embodiment of the present disclosure.
Figure 2B:
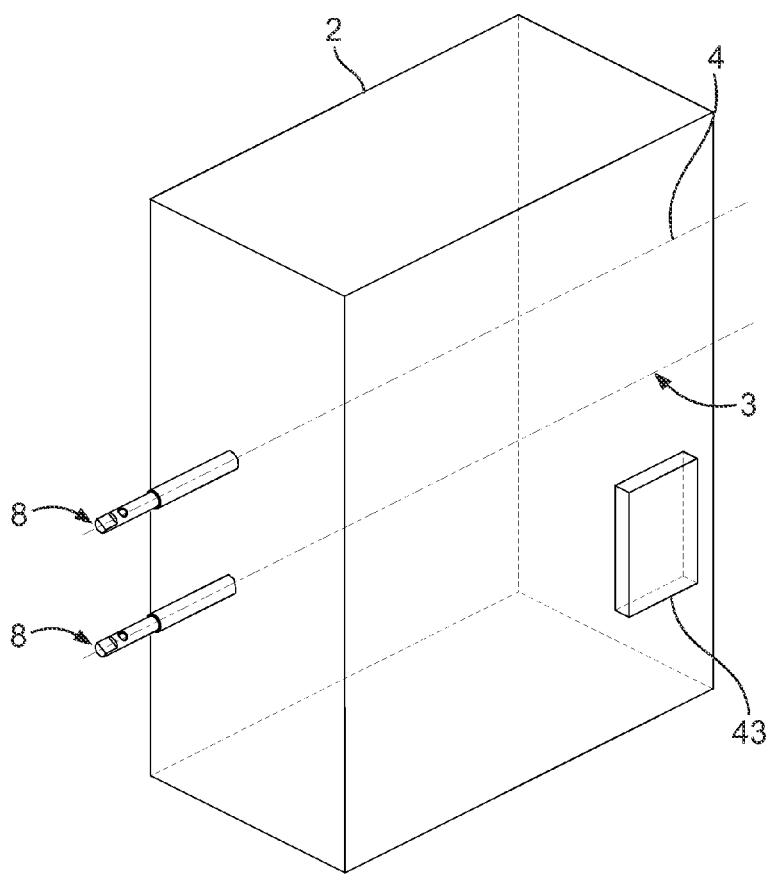
FIG. 2B is an isometric view showing the union between (i) example source contact shafts of the switch-panel assembly of FIG. 1A and (ii) example switch panel contacts of the switch-panel assembly of FIG. 1A, according to an example embodiment of the present disclosure.

FIG. 2A is an example electrical schematic showing the first source contacts 3 and second source contacts 4. Further, FIG. 2B is an isometric view showing the union between (i) the source contact shafts 8 of the switch-panel assembly 2 and (ii) first source contacts 3 and second source contacts 4. In particular, FIG. 2B shows a typical two shaft switch-panel assembly 2 connecting to contact shafts 8 with the typical circuit diagram described in FIG. 2A. The typical switch-panel assembly 2 consists of first source contacts 3 and second source contacts 4. In the example of FIG. 2A, the second source contacts 4 are shown in the open state, whereas the first source contacts 3 are shown in the close state.

Figure 3:
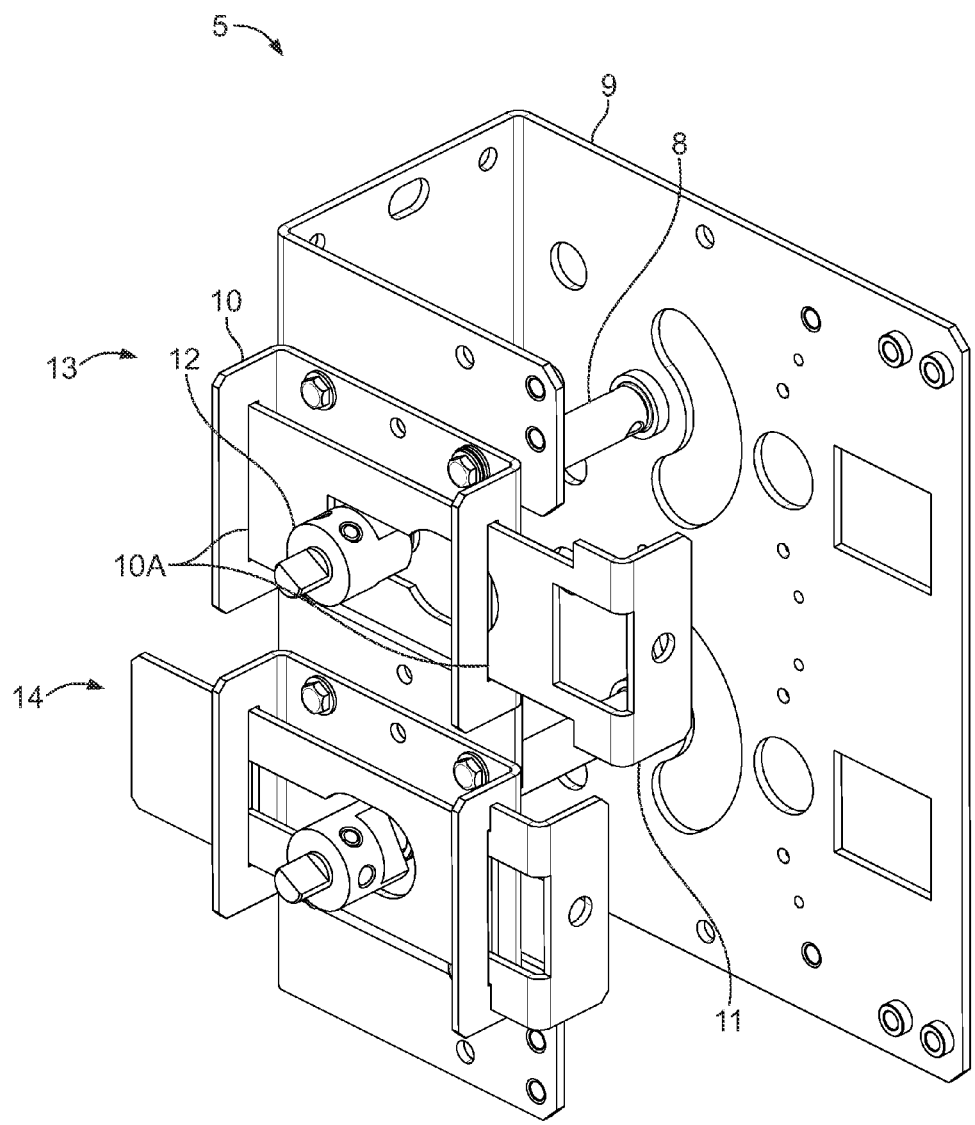
FIG. 3 is an isometric view showing example operator mechanical latch assemblies of the lockout-tagout mechanism of FIG. 1A, according to an example embodiment of the present disclosure.

FIG. 3 is an isometric view showing example contact-operator mechanical latches of the transfer-switch system 100. In particular, FIG. 3 shows the operator or operator assembly 5 having mechanical latch assembly 13 and mechanical latch assembly 14. The mechanical latch assembly 13 is shown in "contacts-locked" state, and mechanical latch assembly 14 is shown in "contacts-unlocked" state. The contact shaft 8 pivots in operator frame 9 and slide carrier 10. Slide carrier 10 is bolted to the side of operator frame 9. Further, slide 11 rides inside of the slide slots 10A of the slide carrier 10. The latching hub 12 is pinned rigidly to the contact shaft 8.

Figure 4A:
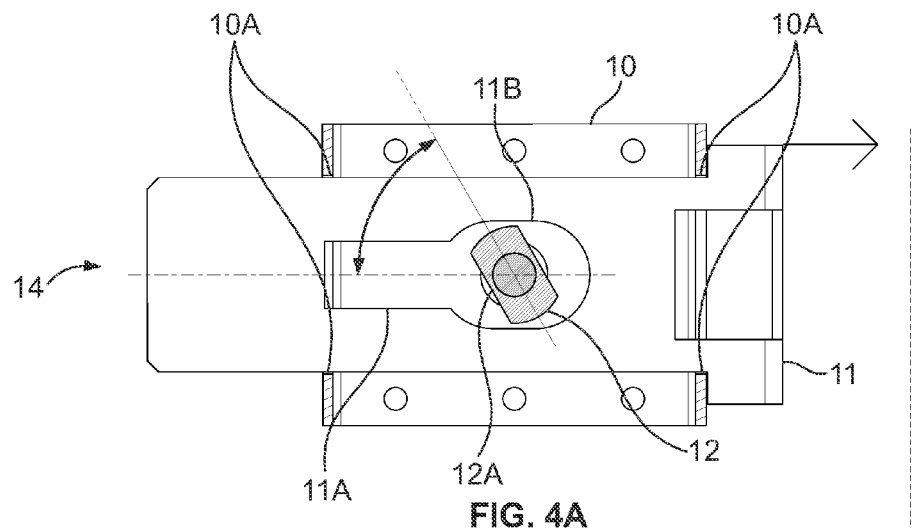
FIGS. 4A-C show different example states possible for example operator mechanical latches of the lockout-tagout mechanism of FIG. 1A, according to an example embodiment of the present disclosure.
Figure 4B:
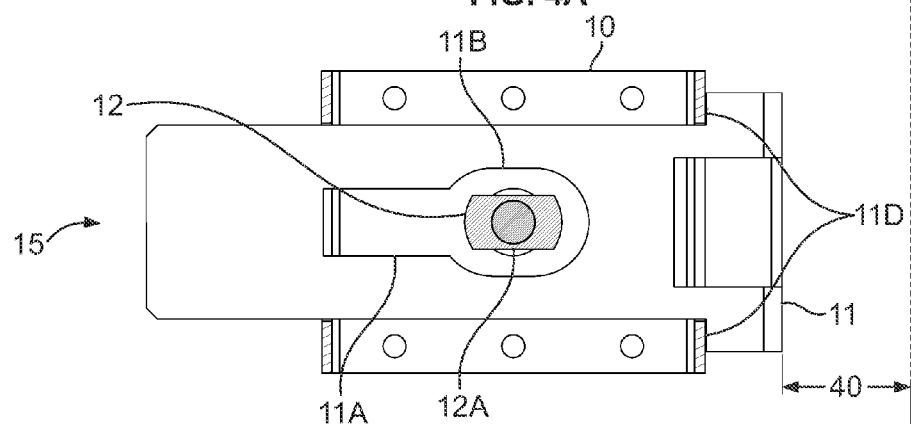
Figure 4C:
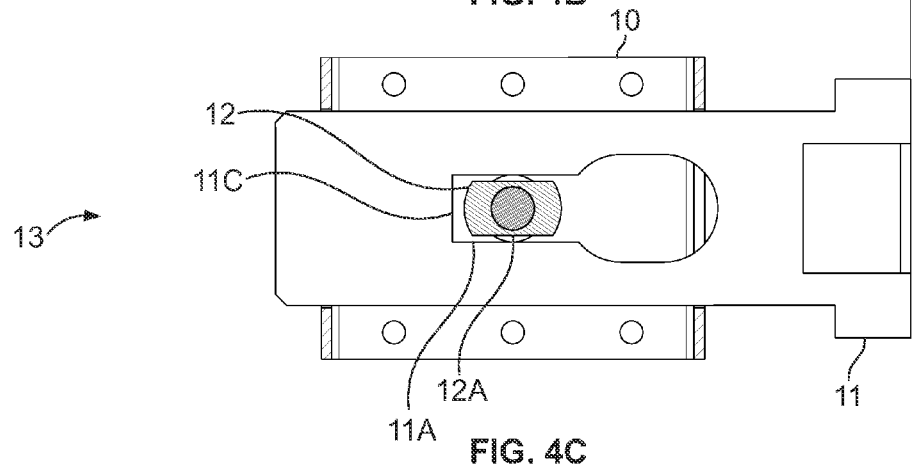

FIGS. 4A, 4B & 4C show different example states possible for the mechanical latches 13 and 14. In particular, FIGS. 4A, 4B & 4C show the three different states which may exist in the mechanical contact latching assemblies 13 and 14. The following description will focus on only first source contacts 3 and latch 14. However, although the different states are described primarily with respect to first source contacts 3, it should be understood that the same also applies for second source contacts 4 and latch 13.

FIGS. 4A-C show slide 11 inside of slide slots 10*a*. The slide slot 10*a* comprises proximal end 50 and a distal end 52, where the proximal end is shaped so as to allow for the latching hub 12 to rotate between a first position in which the first source contact 3 is closed and a second position in which the source contact 3 is open, and wherein the distal end is sized such that interference between the distal end and the latching hub prevents the latching hub from entering the distal end when the latching hub is in the first position. In an example embodiment, rotating between the first position and the second position comprises rotating about 90 degrees. As used herein, rotating about 90 degrees comprises rotating between 85-95 degrees. However, rotating between the first position and the second position may comprise rotating more or less than about 90 degrees. For instance, in an example, rotating between the two positions may comprise rotating between 45 and 135 degrees. Other examples are possible as well.

FIG. 4A shows the mechanical latch assembly 14 in a "contacts-unlocked" state. The slide 11 is in the normal position with the slide return stop limit 11D contacting the slide carrier 10. The contact shaft 8 is rotated such that the first source contacts 3 are closed. The latching hub 12 is allowed to rotate within the slide unlocked slot 11B, from the first position to the second position, which allows the first source contacts 3 to be opened. When first source 3 contacts are closed, the hub latching faces 12A are not aligned with the slide latching slot 11A. The interference between the latching hub 12 and the slide 11 does not allow the first source contacts 3 to be in "contacts-locked" state.

FIG. 4B shows the mechanical latch assembly 14 in the "contact-unlocked" state. First source contacts 3 are shown open. In this state, the pull limit 11C of slide 11 is contacting the slide carrier 10. The contact shaft 8 is rotated such that the first source contacts 3 are open. The latching hub 12 is allowed to rotate within the slide unlocked slot 11B which allows the first source contacts 3 to be closed. When first source contacts 3 are open, the hub latching faces 12A are aligned with the slide latching slot 11A allowing the slide 11 to be pulled thus locking the first source contacts 3 in the "open" position should a user choose so.

FIG. 4C shows the mechanical latch assembly 14 in a "contacts-locked" state. The slide's 11 return stop limit 11C hits latching hub 12 to limit the distance which the slide 11 may be actuated. In this position, the latching hub 12 is captured in the slide locking slot 11A. The interference between the latching hub 12 and the slide latching slot 11A prevents the contact shaft 8 which is rigidly mounted to latching hub 12 from rotating and closing first source contacts 3. The slide 11 is captured in the slide slots 10A of and thus is not allowed to rotate. The mechanical latching handle stroke 40 is shown and corresponds with the distance handle 25 is pulled by the user in proximal direction 56.

Figure 5:
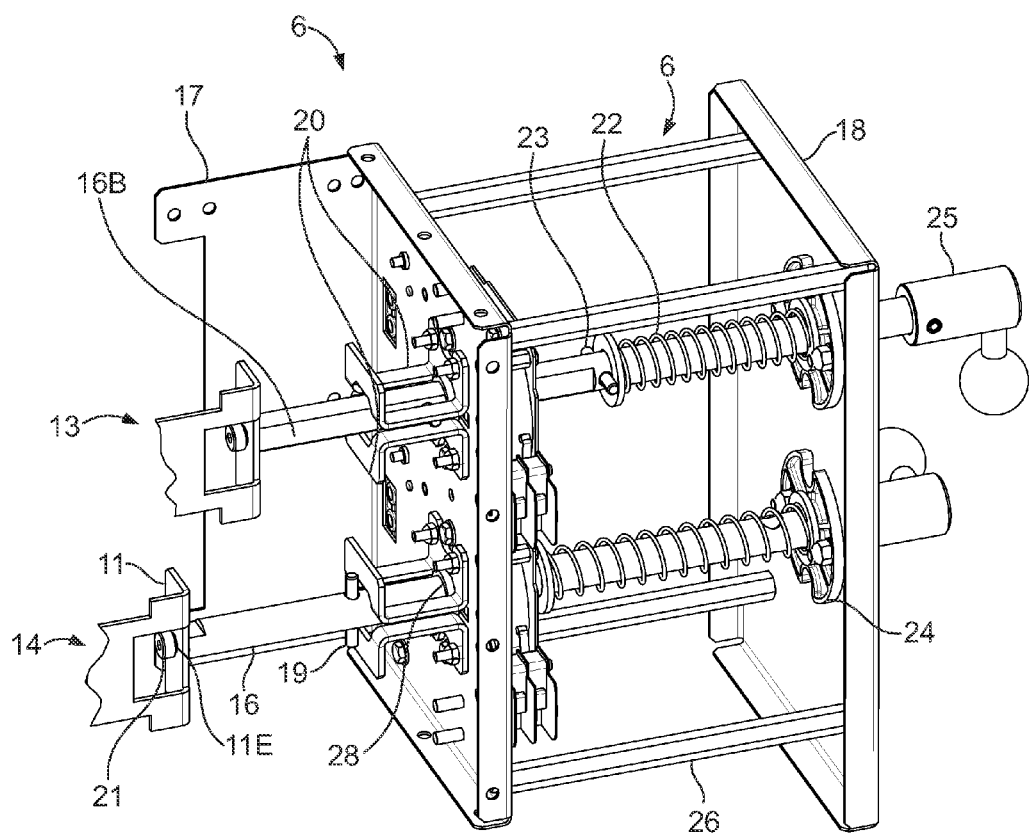
FIG. 5 shows example actuation mechanisms of the latches of the lockout-tagout mechanism of FIG. 1A and respective links to an example operator mechanism of the lockout-tagout mechanism of FIG. 1A, according to an example embodiment of the present disclosure.

FIG. 5 shows example actuation mechanisms of the latches 13 and 14 of the lockout-tagout mechanism and respective links to the operator mechanism 5. The lockout-tagout mechanism assembly 6 mounts to the operator frame 9 through the main plate 17 and mounting strap 27 as seen in FIG. 1A. The door plate 18 is rigidly mounted to the main plate 17 by the door plate standoffs 26. The actuation rod 16 runs through the inboard bushing 28 which is fitted to the main plate 17, and the outboard bushing 24 which is fitted to the door plate 18. The actuation rod 16 connects to the slide 11 with a shoulder bolt 21 which runs through the rod pivot hole 11E. The rod compression spring 22 applies pressure from the outboard bushing 24 to the rod return spring pin 23 which is mounted rigidly to the actuation shaft 16. The handle 25 is mounted rigidly to actuation shaft 16.

FIGS. 6A-F show different example states of the turn/pull interlock of the latches. In particular, FIGS. 6A-F show the actuation shaft 16, pin guide brackets 20, and rod alignment pin 19. The following description will focus on first source contacts 3 and latch 14. However, it should be understood that the same also applies for second source contacts 4 and latch 13.

Figure 6A:
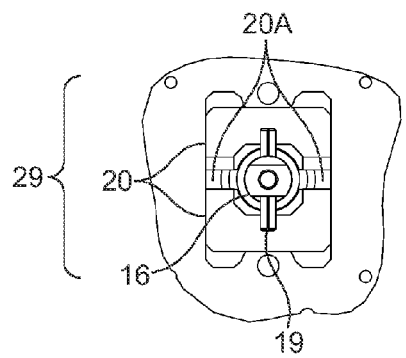
FIGS. 6A-B show a front view and a side view, respectively, of an example state of the turn/pull interlock of an example actuation mechanism of a latch of the lockout-tagout mechanism of FIG. 1A, according to an example embodiment of the present disclosure.
Figure 6B:
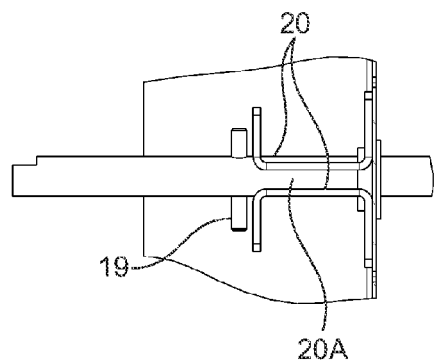

FIGS. 6A-B show a non-inhibited electrical lockout state 29. With the actuation rod 16 in this angular orientation, the inhibit switches 31 and operator cut off switch 32 (see FIG. 8) are in the non-inhibited electrical lockout state 29. The rod alignment pin 19 does not align with the pin slot 20A, thus preventing the actuation shaft 16 from being pulled to engage the mechanical latch assembly 14. If the actuation rod 16 is pulled in an attempt to lock the first source contacts 3 open, the rod alignment pin 19 will interfere with the face of the pin guide brackets 20 not allowing the slide 11 to move. However, when rotated and the rod alignment pin 19 does not interfere, the actuation rod 16 can move laterally in proximal direction 56 through the torsion hub hole 34E (as seen in FIGS. 6D and 6F in conjunction with FIG. 9).

Figure 6C:
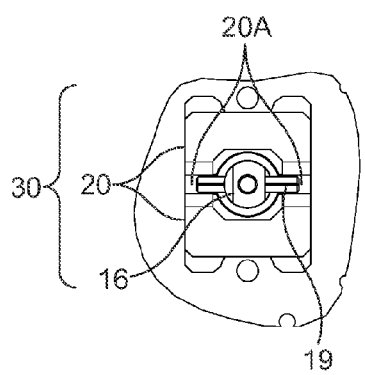
FIGS. 6C-D show a front view and a side view, respectively, of another example state of the turn/pull interlock of an example actuation mechanism of a latch of the lockout-tagout mechanism of FIG. 1A, according to an example embodiment of the present disclosure.
Figure 6D:
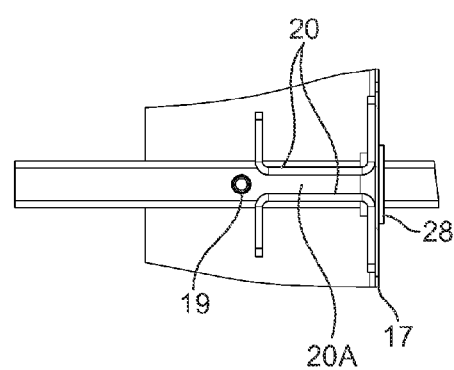

FIGS. 6C-D show the inhibited electrical lockout state 30. In this state, the handle 25 has been turned about 90 degrees by a human user thus activating consecutively the inhibit switch 31 and operator cutoff switch 32. Activating the inhibit switch 31 signals to the electronic controller 43 not to transfer the switch. Further, opening the operator cutoff switch 32 disables the operator from being able to close first source contacts 3 by opening the operator circuit. With the handle 25 turned about 90 degrees and the inhibit switches 31 and operator cutoff switch 32 activated, the rod alignment pin 19 aligns with pin slot 20A. If the first source contacts 3 are open, the handle 25 may be pulled outwards thus pulling the actuation rod 16 and engaging the latching hub 12 in the slide latching slot 11A. When the handle 25 is rotated about 90 degrees and pulled out in proximal direction 56, the rod padlock hole 16A (see FIG. 7) is exposed. In an example embodiment, the padlock hole 16A may be exposed after the handle is pulled out a threshold amount in the proximal direction. The threshold amount may be any suitable amount. For example, the threshold amount may be 1.5 inches. However, the threshold distance may be greater or less than 1.5 inches.

If a padlock 7 is inserted into the rod padlock hole 16A, the first source contacts 3 will be in the open position and unable to be closed due to the "contacts locked" mechanical latching assembly 13 and the inhibited electrical lockout state 30.

Figure 6E:
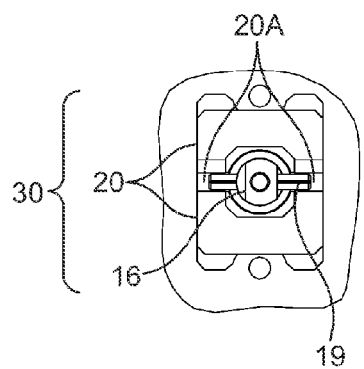
FIGS. 6E-F show a front view and a side view, respectively, of yet another example state of the turn/pull interlock of an example actuation mechanism of a latch of the lockout-tagout mechanism of FIG. 1A, according to an example embodiment of the present disclosure.
Figure 6F:
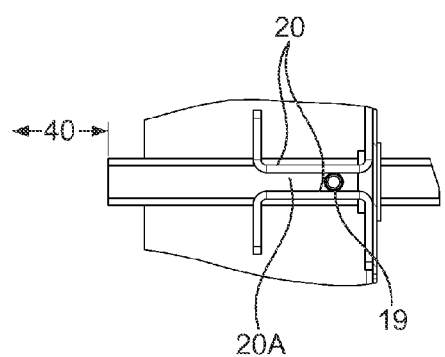

FIGS. 6E-F show the mechanical latch handle stroke 40. If a padlock 7 is not inserted into rod padlock hole 16A and the human user releases the handle 25, the rod compression spring 22 will automatically push the actuation rod 16 back thus unlocking the first source contacts 3 by changing the mechanical latch state to "unlocked." Once the rod alignment pin 19 clears the pin guide slot 20A the torsion spring 33, described in FIG. 9, rotates the torsion hub 34 thus changing from the "inhibited" electrical lockout state 30 to the "non-inhibited" electrical lockout state 29.

Figure 7:
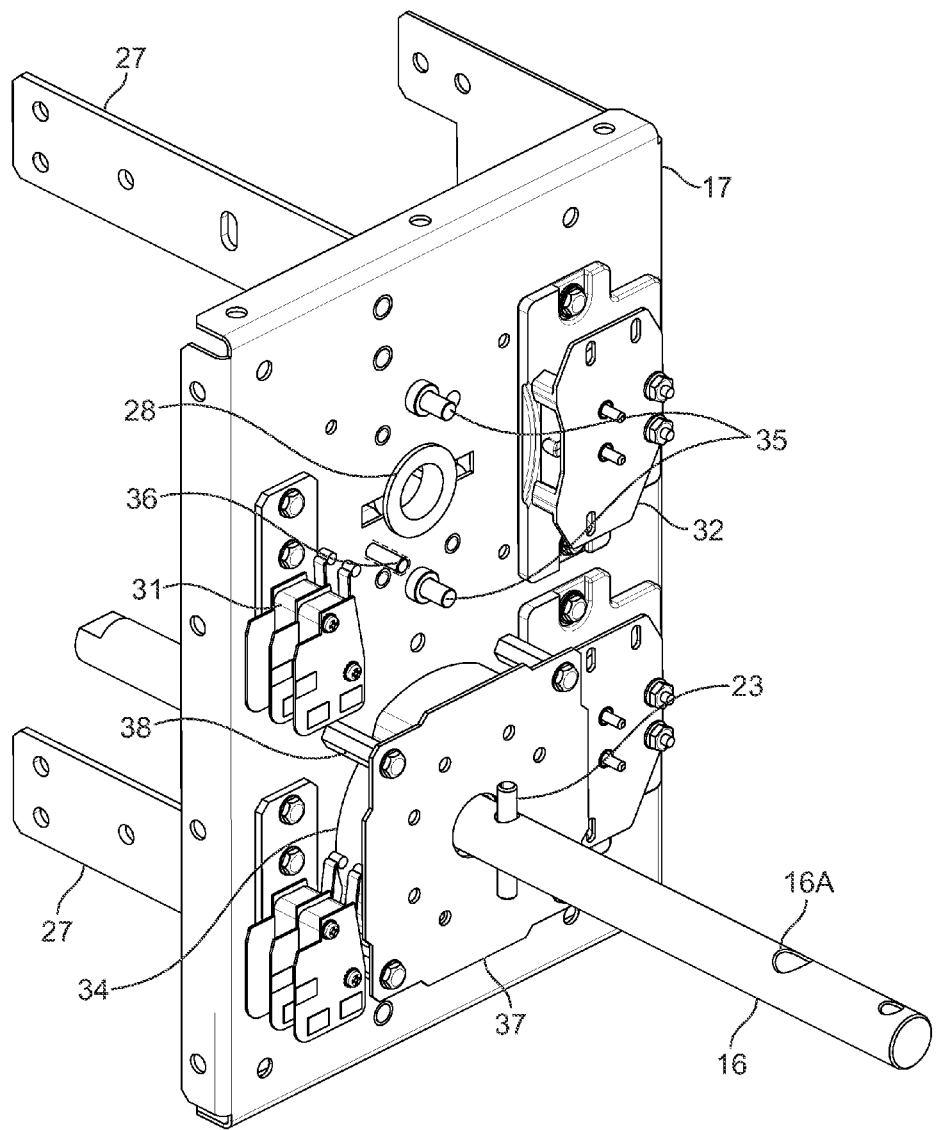
FIG. 7 shows an isometric view of an example controller inhibit and operator cutoff mechanism of the lockout-tagout mechanism of FIG. 1A, according to an example embodiment of the present disclosure.

FIG. 7 shows an isometric view of an example electronic-inhibit mechanism of the lockout-tagout mechanism of FIG. 1A. In particular, FIG. 7 shows details of the components mounted to the main plate 17. The torsion stop screws 35 and torsion spring leg screw 36 are mounted to and protrude from the main plate 17 surface. These screws are described further in FIGS. 8-9. The actuation rod 16 runs through the inboard bushing 28. The torsion hub 34 runs on the actuation rod 16 and is held captive by the inboard bushing 28 flange and the hub retaining plate 37. The hub retainer plate 37 is mounted to the main plate 17 by the hub plate standoffs 38. The inhibit switches 31, and operator cutoff switches 32 are connected (e.g., bolted) to the main plate 17.

Figure 8:
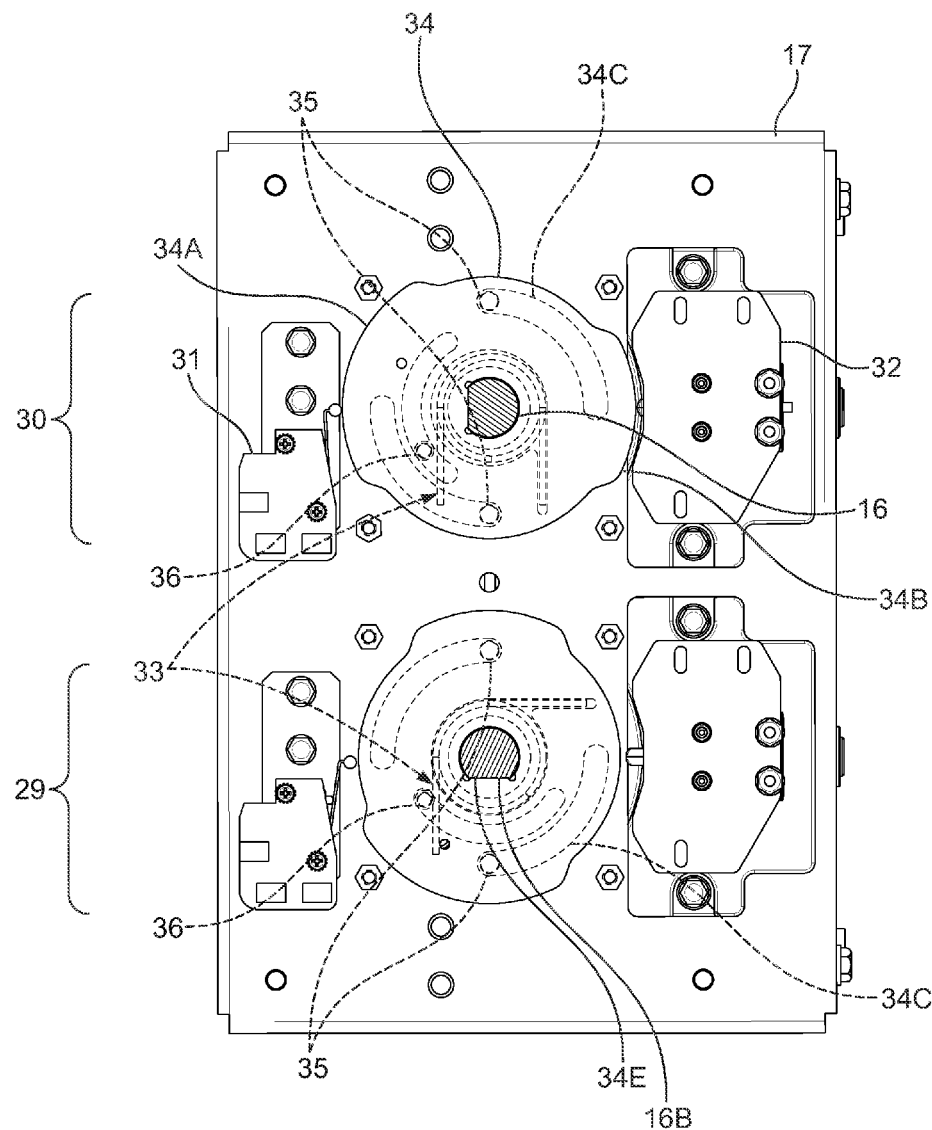
FIG. 8 shows a front view of the mechanisms of FIG. 7, according to an example embodiment of the present disclosure.
Figure 9:
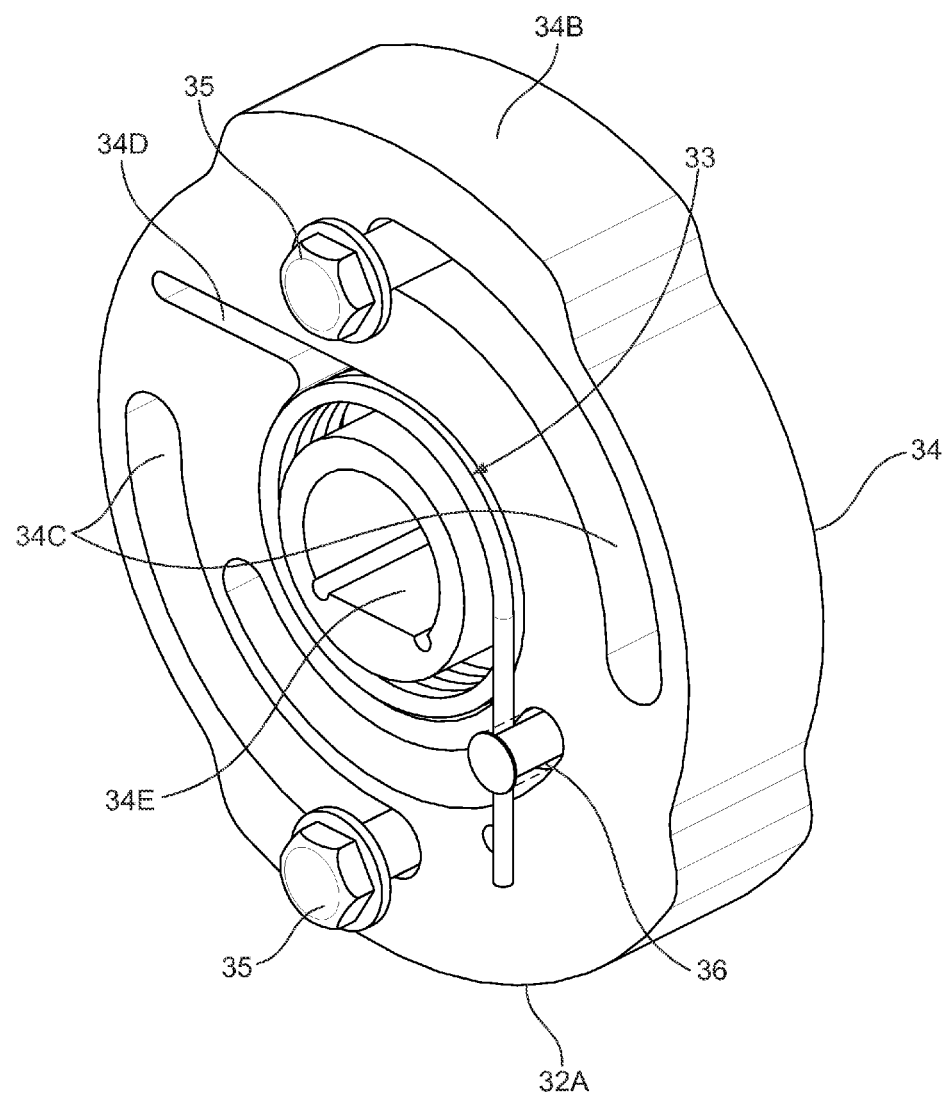
FIG. 9 shows an isometric view of the torsion hub component of the controller inhibit and operator cutoff mechanism of FIG. 7, according to an example embodiment of the present disclosure.

FIG. 8 shows a front view of the electronic-inhibit mechanism of FIG. 7. In particular, FIG. 8 shows details of the torsion hub 34 operation. The torsion hub 34 is indexed to the angle of the actuation rod 16 by means of the torsion hub 'D' shape hole 34E which aligns to the actuation rod flat 16B. When the handle 25 is turned by a user, the actuation rod 16 turns the torsion hub 34. When the handle 25 is pulled by a user, the actuation rod 16 is allowed to slide through the torsion hub 34. As the torsion hub 34 is being rotated about 90 degrees, the torsion hub inhibit switch cam surface 34A actuates the inhibit switch 31 and the torsion hub operator cutoff cam surface 34B actuates the operator cutoff switch 32. The torsion stop screws 35 run inside the torsion hub rotation slots 34C. The rotation slot 34C to torsion stop screw 35 interface acts as rotational limit stops for both the "non-inhibited" electrical lockout state 29 and the "inhibited" electrical lockout state 30. The torsion spring 33 described in FIG. 9 is seen held in preload between the torsion spring leg screw 36 and the torsion hub 34 in the "non-inhibited" electrical lockout state 29. The torsion spring 33 is shown in the loaded position in the "locked contacts" state 30 and is held between the torsion spring leg screw 36 and the torsion hub 34.

FIG. 9 shows an isometric view of the torsion hub component of the electronic-inhibit mechanism of FIG. 7. In particular, FIG. 9 shows details of the torsion hub 34 and torsion spring 33. The torsion spring 33 sits inside the torsion hub spring pocket 34D with one leg in the pocket 34D and the other leg on the torsion spring leg screw 36. The torsion stop screws 35 are shown riding inside of the rotation slots 34C where they act as limits at 0 and 90 degrees. The torsion stop screws 35 and the torsion spring leg screw 36 are mounted to the main plate 17 not shown in FIG. 9.

Figure 10A:
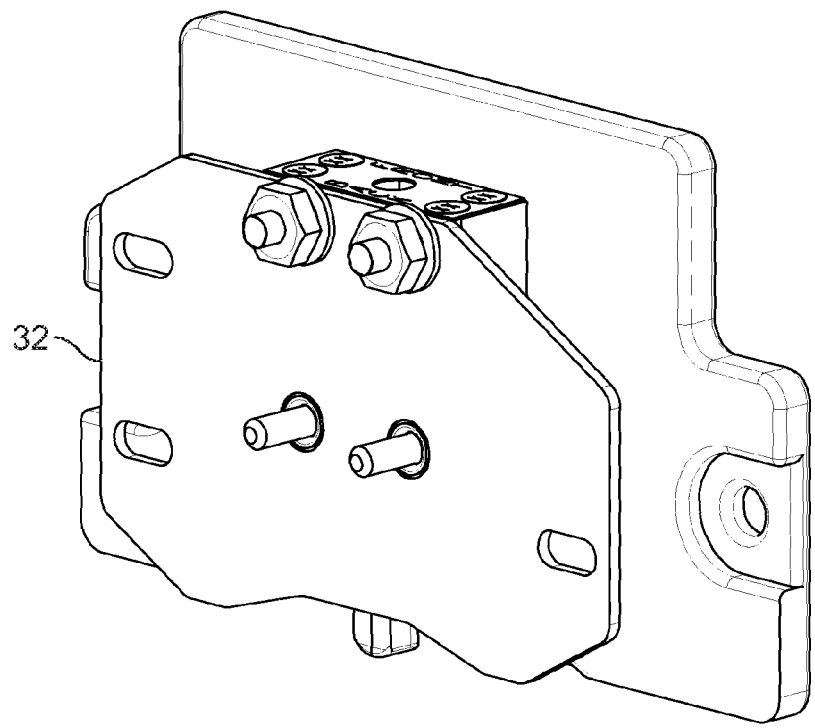
FIG. 10A shows a controller inhibit switch, according to an example embodiment of the present disclosure.
Figure 10B:
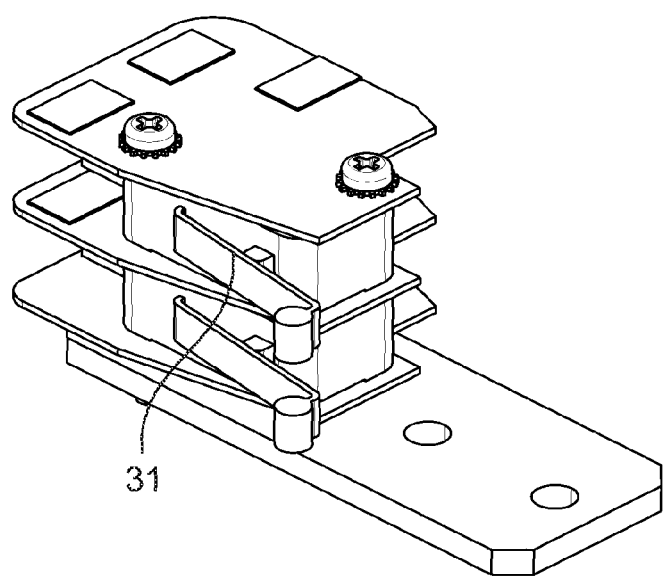
FIG. 10B shows an operator cutoff switch, according to an example embodiment of the present disclosure.

FIGS. 10A-B show the inhibit switches of the electronic-inhibit mechanism of FIG. 7. In particular, FIG. 10A shows details of inhibit switch 31, and FIG. 10B shows details of a typical operator cutoff switch 32. Any suitable operator cutoff switch and inhibit switch may be used.

Figure 11A:
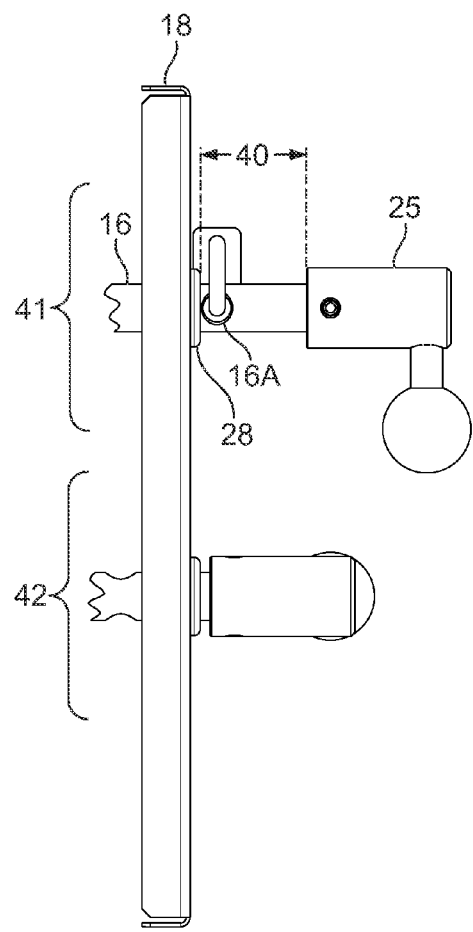
FIGS. 11A-B show a side view and a front view, respectively, of an example user interface with the handles and padlock of the latch of the lockout-tagout mechanism of FIG. 1A, according to an example embodiment of the present disclosure.
Figure 11B:
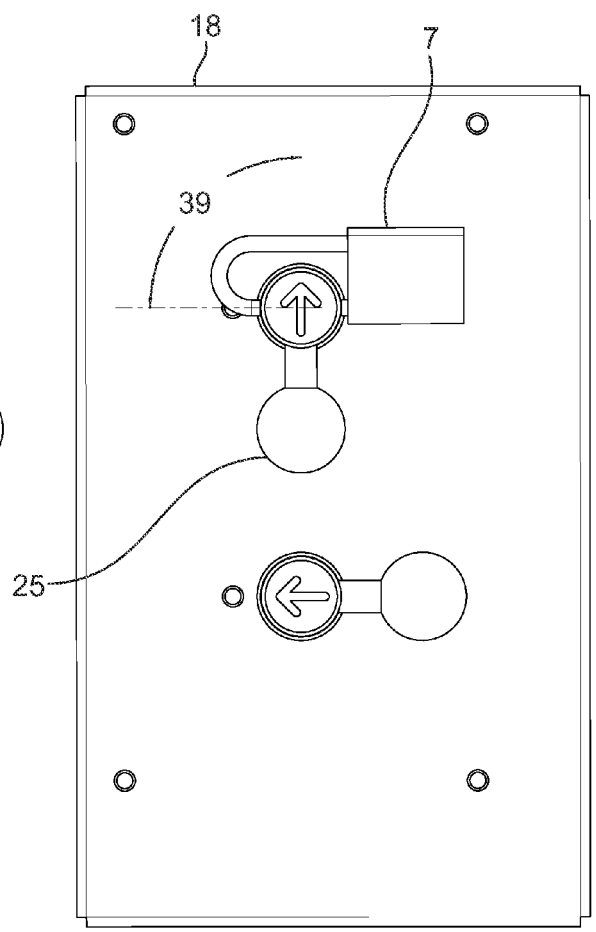

FIGS. 11A-B shows an example user interface with the handles and padlock of the lockout-tagout mechanism of FIG. 1A. In particular, FIGS. 11A-B show the handles 25 both in the unlocked handle position 42 and the "locked-out tagged-out" handle position 41. The electrical inhibit handle rotation 39 is shown as well as the mechanical latching handle stroke 40. In the "locked-out tagged-out" handle position 41, the padlock 7 is shown engaged in the padlock hole 16A maintaining the latching handle stroke 40 by resting against the outboard bushing 28 and door plate 18. With handle 25 in the "locked-out tagged-out" handle position 41 the lockout mechanism assembly 6 maintains the "inhibited" electrical state 30 and the operator assembly 5 maintains the mechanical latch assembly 13 in "locked-contacts" state.

Figure 12:
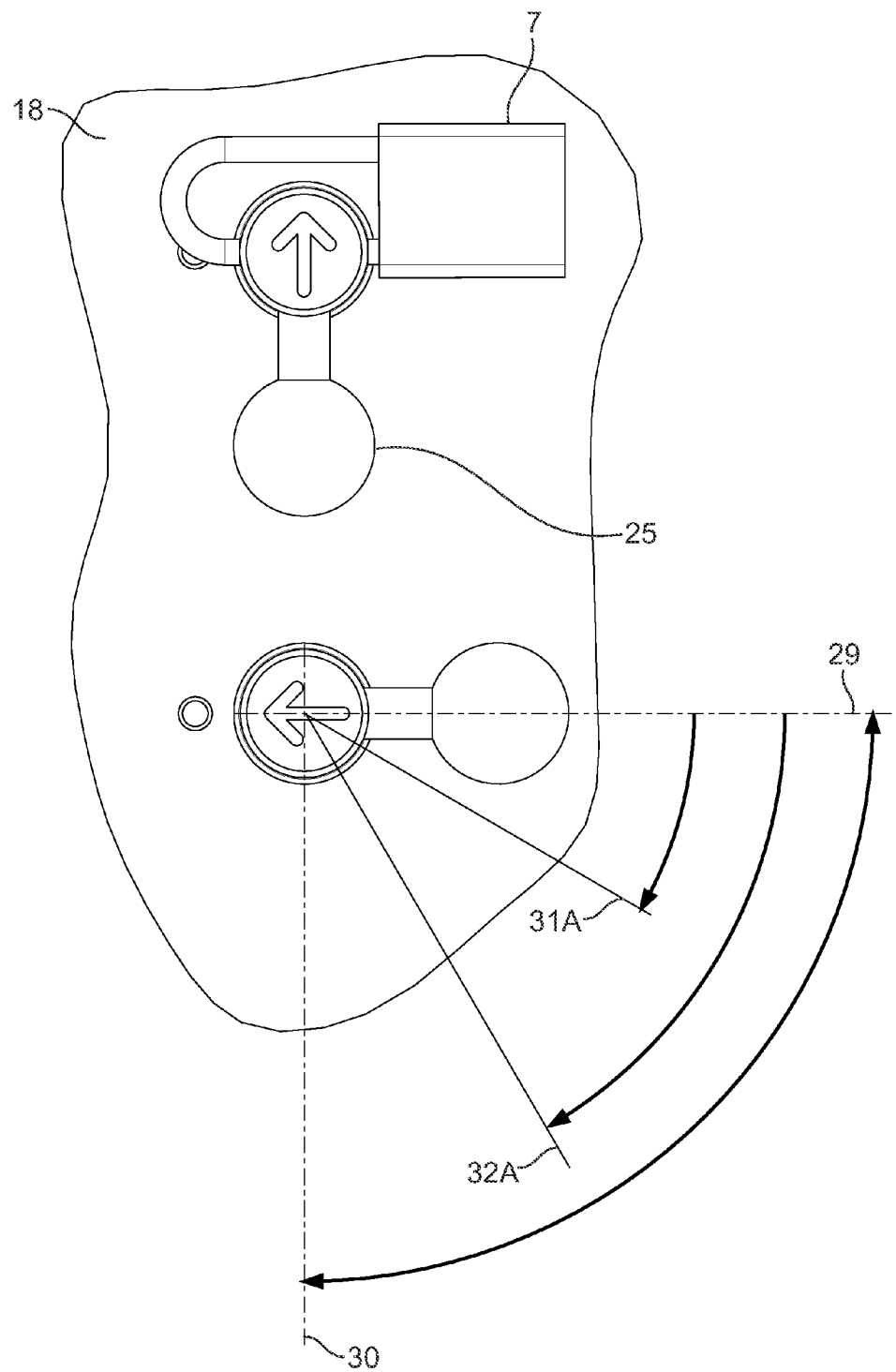
FIG. 12 shows details of an example electrical inhibit handle turn feature of the latch of the lockout-tagout mechanism of FIG. 1A, according to an example embodiment of the present disclosure.

FIG. 12 shows the details of the electrical inhibit handle turn feature. When the user actuates the handle 25 and turns the handle 90 degrees clockwise, the inhibit switch is activated first at the inhibit switch activation angle 31A. The operator cut off switch 32 is activated second at the operator cut off angle 32A. At the full 90 degrees the lockout mechanism assembly 6 is in the "inhibited" electrical state 30. Activating the inhibit switch 31 first prevents the controller from sending a transfer signal. It should be understood that the inhibit switch activation angle 31A and the operator cut off angle 32A and intended as examples only, and other inhibit switch activation angles and the operator cut off angles are possible as well.

Although the rotation of the latch handle is described herein as being about 90 degrees in order to effect the lockout-tagout described above, it should be understood that the rotation of the latch handle may be greater than or less than about 90 degrees. For instance, the rotation could be between about 45 degrees and about 135 degrees. Other examples are possible as well.

The switch controller and switch operator described above may be any suitable switch controller and switch operator. For instance, the switch controller and switch operator may be any switch controller and switch operator now known in the art or later developed. Further, in an example embodiment, the transfer-switch system 100 or components of the transfer switch system 100 (e.g., electronic controller 43) may include a processing unit and data storage, which includes one or more instructions executable by a processor or computing device for implementing specific logical functions or steps in the transfer-switch system process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems, or other articles of manufacture. The computer readable medium may be considered a computer readable storage medium, for example, or a tangible storage device.

Figure 13:
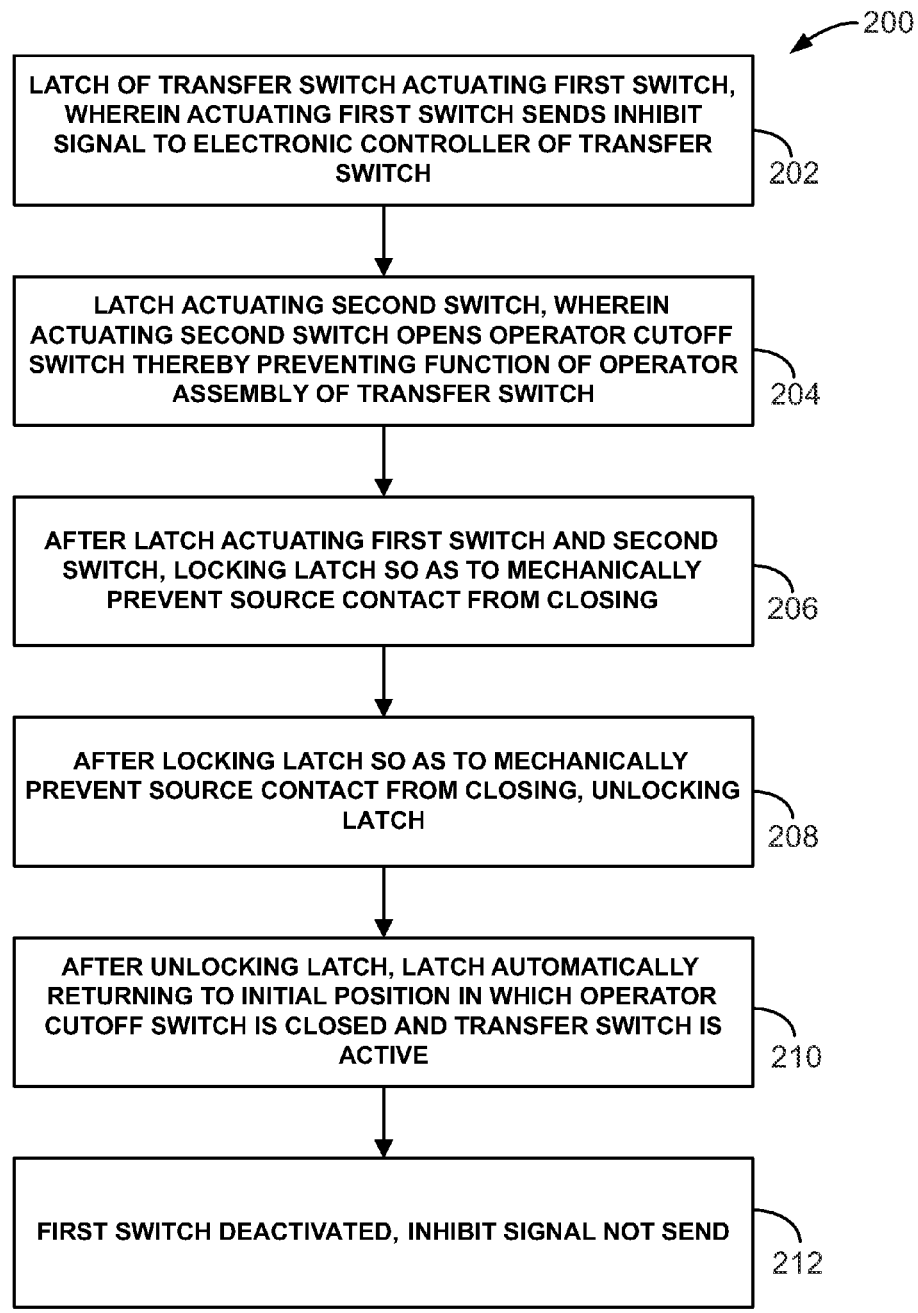
FIG. 13 illustrates an example lockout-tagout method, according to an example embodiment of the present disclosure.

FIG. 13 is a flow chart depicting functions that can be carried out in the disclosed process in practice, in accordance with an example embodiment. The method 200 of FIG. 13 provides for convenient, safe, and reliable locking and tagging out of a transfer switch at the transfer switch itself. Method 200 shown in FIG. 13 presents an embodiment of a method that could be carried out by transfer-switch system 100 of FIG. 1A, or one or more components of the transfer-switch system 100. For instance, latch assembly 13 or latch assembly 14 may carry out method 200.

As shown in FIG. 13, at block 202, the method involves a latch of a transfer switch actuating a first switch, wherein actuating the first switch sends an inhibit signal to an electronic controller of the transfer switch. At block 204, the method then involves, the latch actuating a second switch, wherein actuating the second switch opens operator cutoff switch thereby preventing function of the operator assembly of the transfer switch. At block 206, the method also involves after the latch actuating the first switch and the second switch, locking the latch so as to mechanically prevent the source contact from closing. The method may also involve, at block 208, after locking the latch so as to mechanically prevent the source contact from closing, unlocking the latch. Further, the method may involve, at block 210, after unlocking the latch, the latch automatically returning to an initial position in which the operator cutoff switch is closed and the transfer switch is active. Further, in an example embodiment, at block 212, the first switch may be deactivated and the inhibit signal is not sent.

3. Example Benefits of the Disclosed Methods and Systems

As described above, the proposed transfer-switch systems and methods beneficially allow for locking and tagging out electrical equipment such as a transfer switch. Typical automatic transfer switches are not provided with means to perform lockout-tagout procedures. Consequently, to service equipment downstream from the transfer switch, an additional breaker is typically required to be installed downstream from the switch and ahead of the equipment to be serviced. However, the proposed transfer-switch systems and methods beneficially provide an option to eliminate this additional breaker and/or provide additional means for disconnecting power. In accordance with an example embodiment, the disclosed systems and methods allow for applying the lockout-tagout system directly to a power transfer switch. The improved transfer-switch systems and methods for disconnecting power may improve safety when servicing electrical equipment in a transfer-switch system. Further, the disclosed transfer-switch systems and methods are beneficially less complex than existing systems and method for disconnecting power in a transfer switch. This may reduce components needed for disconnecting power and may also time spent disconnecting power.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A transfer switch comprising:
a switch-panel assembly comprising:
a first source contact;
a second source contact; and
an electronic controller;
a lockout-tagout assembly comprising:
a first mechanical latch having a first handle, wherein the first mechanical latch is configured to (i) during rotation of the first handle, (a) actuate a first switch so as to send an inhibit signal to the electronic controller and (b) actuate a second switch so as to disable a first operator thereby preventing closing of the first source contact and (ii) after actuating the first switch and the second switch, (a) move in a proximal direction and (b) lock so as to mechanically prevent the first source contact from closing; and
a second mechanical latch having a second handle, wherein the second mechanical latch is configured to (i) during rotation of the second handle, (a) actuate a third switch so as to send an inhibit signal to the electronic controller and (b) actuate a fourth switch so as to disable a second operator thereby preventing closing of the second source contact and (ii) after actuating the third switch and the fourth switch, (a) move in a proximal direction and (b) lock so as to mechanically prevent the second source contact from closing.

2. The transfer switch of claim 1, wherein the first source contact is a contact for contacting a utility power source, and wherein the second source contact is a contact for contacting a generator power source.

3. The transfer switch of claim 1, wherein the first mechanical latch comprises a slide having a slide slot, and wherein the transfer switch further comprises:
a contact shaft, wherein the contact shaft is in communication with the first source contact and the slide; and
a latching hub fixed on an end of the contact shaft, wherein the latching hub is arranged in the slide slot.

4. The transfer switch of claim 3, wherein the slide slot comprises proximal end and a distal end, wherein the proximal end is shaped so as to allow for the latching hub to rotate between a first position in which the first source contact is closed and a second position in which the source contact is open, and wherein the distal end is sized such that interference between the distal end and the latching hub prevents the latching hub from entering the distal end when the latching hub is in the first position.

5. The transfer switch of claim 4, wherein rotating between the first position and the second position comprises rotating about 90 degrees.

6. The transfer switch of claim 3, wherein the first latch comprises an actuation rod connecting the first handle to the slide.

7. The transfer switch of claim 6, wherein the lockout-tagout assembly further comprises a torsion hub rotationally fixed to the actuation rod, wherein the torsion hub is configured to contact the first switch and the second switch in order to actuate the first and second switches as the first handle is rotated.

8. The transfer switch of claim 7, wherein the torsion hub comprises a torsion-hub hole having a shape corresponding to the shape of the actuation rod, and wherein the actuation rod can move laterally along an axis through the torsion-hub hole.

9. The transfer switch of claim 7, wherein the torsion hub comprises:
a first cam surface for actuating the first switch; and
a second cam surface for actuating the second switch.

10. The transfer switch of claim 7, wherein the actuating rod comprises a padlock hole that is exposed when the first handle is moved a threshold amount in the proximal direction.

11. The transfer switch of claim 1, wherein the lockout-tagout assembly further comprises:
an automatic return feature comprising at least one spring, wherein the automatic return feature is configured to, in response to the first mechanical latch transitioning from a locked state to an unlocked state, automatically return the first mechanical latch to an initial position in which inhibit switch and operator cutoff switches are deactivated and closing of the first source contact is possible.

12. The transfer switch of claim 1, wherein the second mechanical latch comprises a slide having a slide slot, and wherein the transfer switch further comprises:
a contact shaft, wherein the contact shaft is in communication with the second source contact and the slide; and
a latching hub fixed on an end of the contact shaft, wherein the latching hub is arranged in the slide slot.

13. A method comprising:
a latch of a transfer switch actuating a first switch, wherein actuating the first switch sends an inhibit signal to an electronic controller of the transfer switch;
the latch actuating a second switch, wherein actuating the second switch opens an operator cutoff thereby preventing function of an operator assembly of the transfer switch; and
after the latch actuating the first switch and the second switch, locking the latch so as to mechanically prevent the source contact from closing.

14. The method of claim 13, wherein actuating the first and second switch takes place as a latch handle of the latch is rotated.

15. The method of claim 14, wherein locking the latch so as to mechanically prevent the source contact from closing comprises moving the latch handle in a proximal direction.

16. The method of claim 15, further comprising:
before the latch handle is rotated at least a threshold amount, an inner lock of the latch preventing the latch handle from being moved in the proximal direction.

17. The method of claim 15, wherein locking the latch so as to mechanically prevent the source contact from closing further comprises a padlock preventing the latch from rotating.

18. The method of claim 13, further comprising:
after locking the latch so as to mechanically prevent the source contact from closing, unlocking the latch; and
after unlocking the latch, the latch automatically returning to an initial position in which the transfer switch is active and it is possible to close the source contact.

19. The method of claim 13, wherein the source contact is a contact for contacting a generator power source or a utility power source.

20. A transfer switch comprising:
a source contact;
a first switch in communication with an electronic controller;
a second switch in communication with an operator of the transfer switch;
a mechanical latch assembly comprising (i) a slide having a slide slot, (ii) a handle, and (iii) an actuation rod connecting the handle to the slide, wherein the actuation rod is rotatable about an axis and moveable along the axis;
a contact shaft in communication with the source contact and the slide;
a latching hub fixed on an end of the contact shaft, wherein the latching hub is arranged in the slide slot;
a torsion hub rotationally fixed to the actuation rod, wherein the torsion hub is configured to actuate the first switch and the second switch as the handle is rotated from a first position to a second position, wherein actuating the first switch sends an inhibit signal to the electronic controller and actuating the second switch disables the operator thereby preventing closing of the source contact,
wherein the actuation rod is prevented from moving in a proximal direction along the axis when the handle is in the first position, and wherein the actuation rod is configured to move in the proximal direction along the axis after the handle is rotated from the first position to the second position.

* * * * *